United States Patent [19]

Holy et al.

[11] Patent Number: 4,774,753
[45] Date of Patent: Oct. 4, 1988

[54] MEASURING DEVICE FOR A MACHINE TOOL

[75] Inventors: Franz Holy; Alfred Lebersorger, both of Stockerau, Austria

[73] Assignee: Maschinenfabrik Heid AG, Stockerau, Austria

[21] Appl. No.: 853,727

[22] Filed: Apr. 18, 1986

[30] Foreign Application Priority Data

Apr. 18, 1985 [AT] Austria ................................. 1167/85

[51] Int. Cl.$^4$ ........................................... B23Q 3/155
[52] U.S. Cl. ..................................... 29/568; 82/34 R; 33/504; 33/558
[58] Field of Search ............... 409/207, 210, 133, 214, 409/218, 220; 33/178 E, 503, 504, 555, 558; 211/1.5; 82/34 R, 36 A, 2 B; 364/474; 407/11; 29/568

[56] References Cited

U.S. PATENT DOCUMENTS

| | | | |
|---|---|---|---|
| 3,840,994 | 10/1974 | Izumi et al. | 33/557 |
| 3,892,043 | 7/1975 | Bonikowski | 33/178 E |
| 4,447,960 | 5/1984 | Golinelli et al. | 33/178 E |
| 4,524,523 | 6/1985 | Golinelli et al. | 33/561 |
| 4,576,069 | 3/1986 | Bazuin | 409/133 |

*Primary Examiner*—Z. R. Bilinsky
*Attorney, Agent, or Firm*—Herbert Dubno

[57] ABSTRACT

A measuring device for a machine tool comprises at least one sensor mounted on a supporting arm which is movable with the help of a carriage. To perform an exact measurement of the distance between two diametrically opposed points on a work piece, the supporting arm with the sensor is slidably and/or pivotally mounted on the carriage to displace the sensor in a transverse direction over the machine tool turning center. A folding in and out of the supporting arm which is mounted on a holder on the carriage occurs during insertion into and withdrawal from a storage pocket of a tool magazine. Air cleaning means and cooling means for the sensor and the workpiece are provided. In another embodiment of the measuring device the supporting arm can be approximately U-shaped mounted on a shaft with a sensor on the end of each U-leg for a two point workpiece measurement, can be slid along the holder for the supporting arm and is pivotable about 90 degrees. This holder guides each of the sensors over one side of the work piece. From the displacement distance over the machine tool turning center the workpiece diameter is directly ascertainable.

6 Claims, 2 Drawing Sheets

MEASURING DEVICE FOR A MACHINE TOOL

FIELD OF THE INVENTION

Our present invention relates to a measuring device for a machine tool and, more particularly, to a device in a machine tool which automatically measures the dimensions of a workpiece.

BACKGROUND OF THE INVENTION

A measuring device for a machine tool is known in which a sensor is mounted on a movable support which is attached to a slidable carriage.

The sensor on the carriage and/or tool holding and positioning mechanism of the machine tool can be employed for measurements of the workpiece. This sensor travels along and contacts the workpiece after starting from a calibrating position. From the direct displacement of the carriage, a calculator can give the radius of a workpiece clamped in the chuck or of a shaft which is held between the headstock and the tailstock.

Such measurement of the workpiece radius is no longer sufficiently accurate in view of today's exacting requirements because the reference point in the calibrating configuration is subject to a displacement due to heating. These measurement errors can be prevented by a two point measurement of the workpiece. In a two point measurement the diameter of the workpiece can be determined directly.

The sensor contacts two diametrically opposite points on the workpiece directly and ascertains the appropriate dimension directly by numerical computation from the displacement of the carriage. A sensor for sensing the workpiece presence is known which can be mounted on a supporting arm. The supporting arm rests in a cradle-like recess of a carriage and can be pivoted into a working position for measuring the workpiece. Since the range of action of the sensor and support arm only extends approximately to the machine tool turning center, an absolute measurement of a workpiece diameter by the carriage system of the machine tool is possible only for workpieces of small diameter.

OBJECTS OF THE INVENTION

It is an object of our invention to provide an improved measuring device for a machine tool, particularly for measuring the diameter of a workpiece, whereby the aforedescribed disadvantages are obviated.

Another object of our invention is to provide an improved measuring device for a machine tool, which permits a more exact measurement than previously known measuring devices and, especially, a measurement which is independent of the influence of heat on reference points.

SUMMARY OF THE INVENTION

These objects and others which will be made more apparent hereinafter are attained in a measuring device for a machine tool comprising at least one sensor attached to a movable supporting arm attached to a carriage.

According to our invention the supporting arm or the sensor is slidably and/or pivotally mounted on the carriage for displacement in a transverse direction past the machine tool turning center for a two-point workpiece measurement. Thus a sensor position can be reached which lies outside of the direct range of travel of the carriage. Particularly, diametrically opposing measuring points on the workpiece can be reached.

The carriage referred to is the cross slide of the machine tool.

In one embodiment in which the machine tool has a tool magazine the supporting arm is mounted on a holder, which like a tool holder is movable into a working position on the carriage for two-point workpiece measurement and into a storage position in a tool magazine. The measuring device can then be used like a tool which is received in the carriage for storage. No separate travel or distance measuring system is required. Furthermore the supporting arm has a control surface spaced from the pivot axis of the pivotally mounted supporting arm and at least one guide in a storage pocket of the tool magazine inclined in an insertion direction, which during insertion of the holder in the storage pocket engages on the control surface and presses the supporting arm into the stored position corresponding to a folded-in configuration.

Furthermore advantageously a ball-head pin attached to the supporting arm provides the control surface and the guide comprises a guide groove in the side walls of the storage pocket. Thus the folding in or unfolding of the measuring device occurs automatically during insertion and withdrawal from the tool magazine.

Advantageously the supporting arm is spring loaded to provide a pivoting force for swinging the supporting arm into an unfolded or measuring configuration. The pin contacts a stop piece of the holder during unfolding of the supporting arm so that the position of the supporting arm in this unfolded, measuring position is precisely defined. This stop piece aligns with the lateral guide in the side walls of the storage pocket whereby a stable delivery of the control surface to the guide is possible during folding in of the supporting arm.

One particular embodiment of our invention provides that a coupling piece connected to a conduit system for a cooling medium is provided on the holder, whereby the conduit system is switched over from the supply of coolant for a cutting operation to pressurized air during mounting of the holder onto the carriage. An air pressure conduit can run to the sensor to provide for cleaning of the workpiece and the sensor.

For folding in and unfolding of the supporting arm independently of sliding the measuring device in and out of the tool magazine a pneumatic or hydraulic cylinder can be mounted between the supporting arm of the sensor and the holder.

In another embodiment of our invention, the supporting arm provided on the carriage for diameter measurement of the workpiece is a sliding member, especially a cylinder sleeve, which is slidably mounted on the holder and is pivotable and carries two sensors spaced from each other and oriented radially parallel to each other which engage the workpieces in pincer-like fashion in a measuring position.

Advantageously the sliding member is mounted on the holder by a shaft and is pivotable on the shaft about 90°.

The pincer-like measuring device thus lies on the carriage in a resting position without colliding with anything and can be swung into the erect position or is taken out from the tool magazine and put in this position on the carriage prior to a measurement. It is folded out in the transverse direction over the carriage and pushed over or under the workpiece and then rotated about 90°, so that the sensors can engage two diametrically opposed points on the workpiece for a two-point measurement.

BRIEF DESCRIPTION OF THE DRAWING

The above and other objects, features and advantages of our invention will become more readily apparent from the following description, reference being made to the accompanying highly diagrammatic drawing in which:

FIG. 1A is a detail of the sensor tip showing the crown of nozzles for clearing contaminants from the sensor;

SPECIFIC DESCRIPTION

A tool magazine 2 travelling with a slidable support, i.e. the longitudinal-feed carriage 3, is mounted on an inclined machine bed 1.

Figure 1:
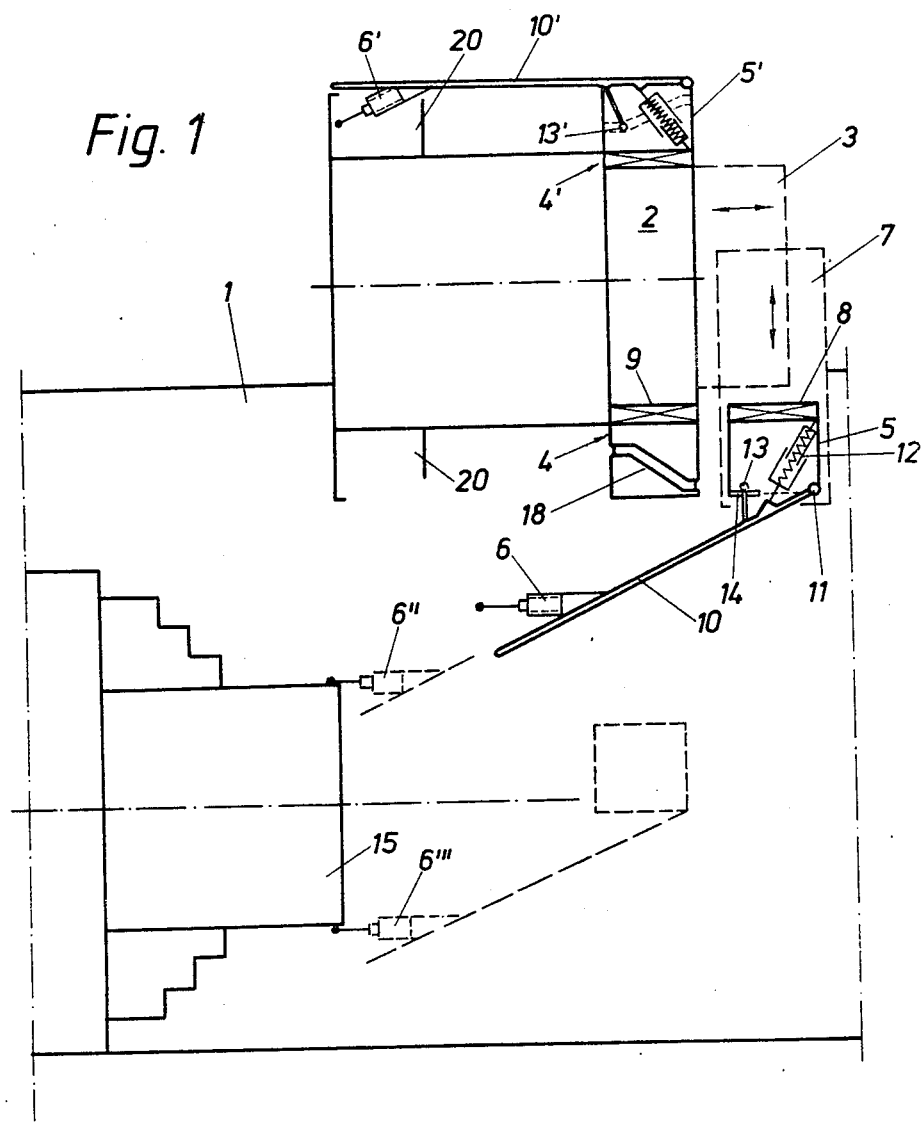
FIG. 1 is a schematic side elevational view of a part of a machine tool with chuck, tool magazine, and a measuring device according to our invention.

The tool magazine 2 is provided with a holder 5 for a sensor 6 slidable into and out of one of its storage pockets 4 as well as the usual tool holders. One such sensor holder 5 is illustrated in FIG. 1 in position on the cross slide carriage 7. Furthermore another sensor holder is in a stored position at 5'.

The holder 5 has a dovetail guide 8 which aligns with the dovetailing groove 9 of the storage pocket 4 in the illustrated alternative position or with a dovetail on the cross slide 7 to hold it in position on the latter.

A slidable delivering mechanism is provided but not illustrated for transferring tool or sensor holders to the cross slide and back from the cross slide to the magazine.

A supporting arm 10 is pivotally mounted on the holder 5 so that it can be swung about a pivot axis 11. This supporting arm 10 carries a sensor 6 on its free end. An unfolding means, preferably a spring 12, urges the supporting arm 10 into a folded out position. A pin 13 of the supporting arm 10 contacts on a stop piece 14 which limits the unfolded orientation angle of the supporting arm 10 in the folded out position.

The tip 6a of the sensor 6 mounted on the supporting arm 10 can be brought into contact with a workpiece 15 mounted in the chuck 15a in the position 6" by appropriate motion of the slidable support 3 and the carriage 7. However also the diametrically opposed measuring point (sensor position 6''')is reachable, although the range of action of the carriage 7 already ends at the machine tool turning center. The diameter of the workpiece 15 is ascertained by the Computer C from the difference of the carriage travel required to reach the two positions 6" and 6''' and is displayed at D.

An essential prerequisite for trouble free operation of the tool magazine 2 is that the pivot diameter is exceeded by none of the tools. This principle also applies to the holder 5 with the supporting arm 10 and the sensor 6, i.e. the sensor lies wholly within the tool orbits of the magazine.

Figure 2:
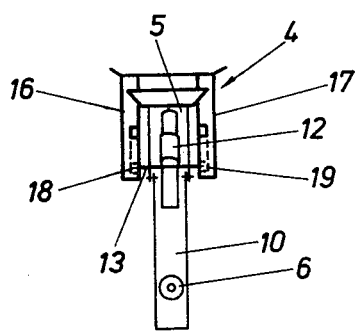
FIG. 2 is a schematic front elevational view of the storage pocket, the holder with supporting arm and sensor of the measuring device of FIG. 1.

FIG. 1 shows that the supporting arm 10 is folded into the position 10' automatically during pushing of the holder 5 into the pocket 4 by two guide grooves 18 and 19 slanted in the insertion direction and provided in the side walls 16 and 17 of the pocket 4 (FIG. 2). In these guide grooves 18 and 19 the pin 13 acts as a control surface during the pushing in of the supporting arm 10.

In a single operation the pushing in motion guides the pin 13 radially inwardly against the force of the spring 12 and thus folds in the supporting arm 10.

In a housing portion of the tool magazine 2 a guard member 20 is provided which receives the sensor 6' and the supporting arm 10' in the folded in configuration. The guard member 20 is closed exteriorly by the supporting arm 10' which acts as a cover for it.

Upon pushing of the holder 5 out of the magazine the above operations are reversed. The holder 5 is folded out into the working position by the pin 13 sliding in the guide groove 18 and 19.

As soon as the holder 5 is fixed on the carriage 7 a coupling piece 32 operates a sensor 33 such as a limit switch controlling the value 34 of the conduit system 30 for machine cooling to switch flow from a source 35 of coolant to a source 36 of pressurized air. At the command for release of the measuring device from the magazine 2, therefore, the cooling medium is shut off and the conduit system 30 is blown out with pressurized air. The pressurized air flowing through a flexible hose 30 reaches the sensor 6 by way of the holder 5 where it will blow around the sensing element 6a in the direction of the workpiece 15 for example through a crown 30a of nozzles thereby cleaning the measuring point as an alternative to the tip of coolant hose 30b and the tip of the sensing element 6a occurs.

When no magazine 2 is present the measuring device comprising holder 5, supporting arm 10 and sensor 6 can be mounted for example in a tool revolving head or turret instead of in a pocket 4. To make a measurement the revolving head is rotated so that the measuring device lies opposing the workpiece 15. By unfolding the supporting arm 10 by an electrical, pneumatic or hydraulic mechanism the sensor 6 directly contacts the workpiece 15. The carriage 7 is displaced a distance so that the sensor 6 on the supporting arm 10 is correspondingly displaced. Thus a two point measurement (sensor positions 6" and 6''' in FIG. 1) is possible.

Figure 3:
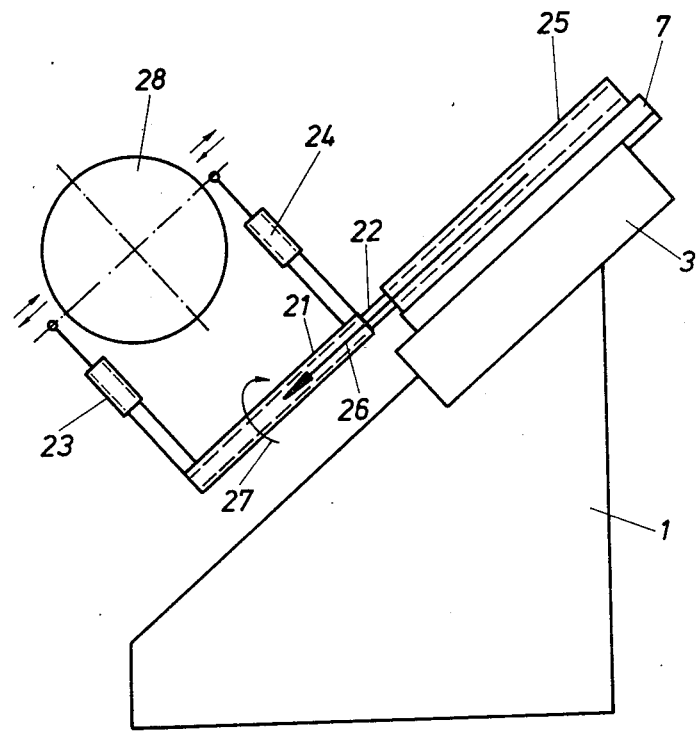
FIG. 3 is a schematic rear elevational view of an alternative embodiment of a slidable and rotatable measuring device according to our invention for determining the diameter of a workpiece shaft.

In the alternative embodiment shown in FIG. 3 a two-point measurement the diameter of a shaft 28 which is held in a headstock dog or chuck and a tailstock center is illustrated. Sensing elements 106 are provided on a shaftlike supporting arm 21 mounted pivotally and slidably on a holder 22 mounted on the carriage 107. Two radially projecting sensors 23 and 24 are mounted on the supporting arm 21. The supporting arm 21 with the sensors 23 and 24 is extended from the housing 25 to perform a measurement (arrow 26) and raised by pivoting about a right angle (arrow 27). The tips of the sensing elements 106 of the sensors 23 and 24 contact then in the central plane of the workpiece 28.

A workpiece diameter is measurable for control of the machine tool 101 by sliding the supporting arm 21 until the sensor 24 contacts on the workpiece 28 and by sliding the supporting arm 21 until the sensor 23 contacts on the workpiece 28. The difference in the displacement of the supporting arm 21 can be used to obtain a measurement. Before the measurement one or both of the sensors 23 or 24 can travel into a calibrating position. Thus eventual errors, which result from extension of the supporting arm 21, can be compensated. Also in the measuring device according to FIG. 3 the displacement of the slidable support 103 occurs directly in the vicinity of the workpiece 28.

For folding in and unfolding the supporting arm 10 in FIG. 1 independently of the insertion and withdrawal of the measuring device from the carriage 3 a hydraulic or pneumatic cylinder can be used instead of the spring 12.

We claim:

1. A lathe-type machine tool comprising:

a bed;

a headstock on said bed, said headstock being provided with means for rotating a workpiece about a turning center lying along a longitudinal axis of the machine tool;

a longitudinal slide shiftable on said bed parallel to said longitudinal axis;

a cross slide shiftable on said longitudinal slide transversely to said longitudinal axis with transverse motion terminating substantially at said longitudinal axis;

a tool magazine on said carriage containing at least one tool insertable onto said cross slide for machining said workpiece;

a measuring device receivable like said tool in said tool magazine and transferrable to said cross slide in replacement of a tool from said magazine thereon, said measuring device comprising:

a holder receivable in said magazine and insertable onto said cross slide replaceably with said tool, at least one swingable arm pivotally mounted on said holder and displaceable thereon to approach a side of said workpiece turned toward said cross slide and an opposite side of said workpiece turned away from said cross slide upon displacement of said cross slide with said motion, and at least one sensor attached to said arm and responsive to contact with opposite measuring points on said opposite sides of said workpiece, said magazine having a pocket for receiving said holder, said arm being swingable to lie substantially parallel to said axis for insertion into said pocket.

2. The machine tool defined in claim 1 wherein said swingable arm is formed with a control surface spaced from a pivot axis thereof on said holder, said magazine having at least one pocket adapted to receive said measuring device and formed with a guide surface inclined to said axis and engageable with said control surface to cam said arm into a position in which said arm lies substantially parallel to said axis for insertion into said pocket.

3. The machine tool defined in claim 2 wherein said control surface is a pin on said arm and said inclined surface is formed by a guide groove on a wall of said pocket.

4. The machine tool defined in claim 2, further comprising spring means acting upon said arm for swinging said arm outwardly upon extracting of said arm from said pocket.

5. The machine tool defined in claim 4, further comprising a stop piece engageable by said pin upon outward swinging of said arm relative to said holder for limiting the outward swinging of said arm.

6. The machine tool defined in claim 5, further comprising means for delivering a liquid coolant to a cutting region of said workpiece and including a conduit and means for switching overflow to said conduit of air in place of said liquid when said measuring device is mounted in said cross slide.

* * * * *